(12) United States Patent
Murphy et al.

(10) Patent No.: US 8,746,339 B2
(45) Date of Patent: Jun. 10, 2014

(54) TRIGGERABLE LOST CIRCULATION MATERIAL AND METHOD OF USE

(71) Applicant: Halliburton Energy Services, Inc., Houston, TX (US)

(72) Inventors: Robert J. Murphy, Houston, TX (US); Matthew L. Miller, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 90 days.

(21) Appl. No.: 13/629,165

(22) Filed: Sep. 27, 2012

(65) Prior Publication Data
US 2014/0083703 A1 Mar. 27, 2014

(51) Int. Cl.
*E21B 43/27* (2006.01)

(52) U.S. Cl.
USPC ......... 166/300; 166/282; 166/305.1; 166/307

(58) Field of Classification Search
None
See application file for complete search history.

(56) References Cited

U.S. PATENT DOCUMENTS

| | | | |
|---|---|---|---|
| 6,818,594 B1 | 11/2004 | Freeman et al. | |
| 7,287,586 B2 | 10/2007 | Everett et al. | |
| 7,306,040 B1 | 12/2007 | Robb et al. | |
| 7,488,705 B2 | 2/2009 | Reddy et al. | |
| 7,534,744 B2 | 5/2009 | Shaarpour | |
| 7,776,797 B2 | 8/2010 | Allin et al. | |
| 7,870,903 B2 | 1/2011 | Fang et al. | |
| 7,891,425 B2 | 2/2011 | Dalrymple et al. | |
| 8,043,997 B2 | 10/2011 | Whitfill et al. | |
| 8,132,623 B2 | 3/2012 | Allin et al. | |
| 2005/0077047 A1 | 4/2005 | Chatterji et al. | |
| 2006/0063681 A1 | 3/2006 | Christanti et al. | |
| 2007/0034378 A1 | 2/2007 | Welton et al. | |

FOREIGN PATENT DOCUMENTS

WO 2014052400 A1 4/2014

OTHER PUBLICATIONS

Halliburton Brochure entitled "CrystalSealSM Service, Treats Injection Wells to Provide Improved Sweep Efficiency and Economics by Preventing or Remediating Direct Communication with Producing Wells," 2007.
Halliburton Brochure entitled "Diamond Seal® Absorbent Polymer for Lost Circulation," 2008.
Halliburton Brochure entitled "Fuse-It™ Lost Circulation Treatment," 2006.
Halliburton Brochure entitled "N-Flow™ 408 Filter Cake Breaker," 2010.
Halliburton Brochure entitled "N-Flow™ 412 Filter Cake Breaker," 2010.
International Search Report and Written Opinion for PCT/US2013/061594 dated Dec. 13, 2013.

*Primary Examiner* — Zakiya W Bates
(74) *Attorney, Agent, or Firm* — McDermott Will & Emery LLP; Craig W. Roddy

(57) ABSTRACT

Methods for preventing or alleviating the loss of drilling fluids and other well treatment fluids into a subterranean formation during drilling or construction of boreholes therein include a drilling fluid including a lost circulation material. The lost circulation material includes a suspension of swelled particles of a pH sensitive polymeric material, the swelled particles capable of reversibly attaching to other swelled particles of the polymeric material. The pH of the aqueous solution is such that each particle of the swelled pH sensitive polymeric material is not attached to other swelled particles, and wherein upon lowering the pH of the suspension, the swelled particles attach to each other.

18 Claims, 1 Drawing Sheet

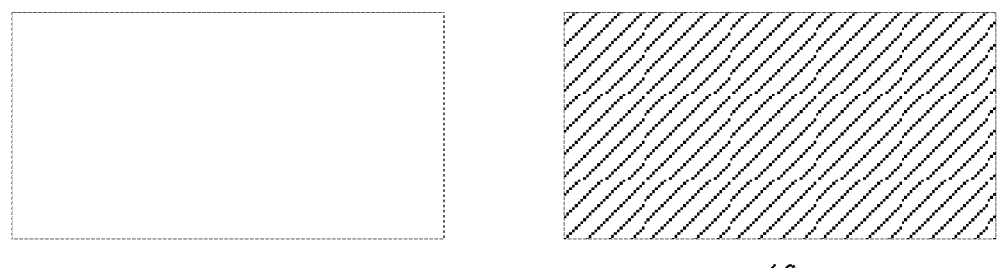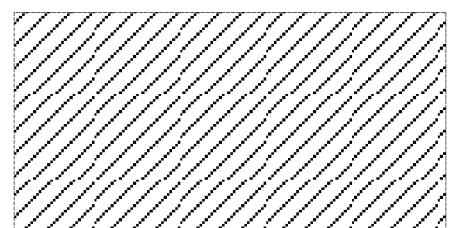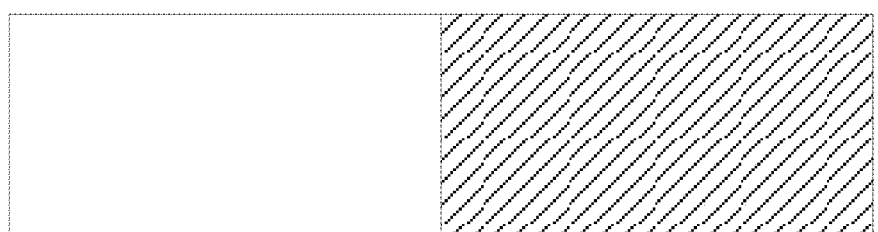

TRIGGERABLE LOST CIRCULATION MATERIAL AND METHOD OF USE

BACKGROUND

The present disclosure pertains to methods and compositions for preventing or alleviating the loss of drilling fluids, fracturing fluids, gravel packing fluids and other well treatment fluids into a subterranean formation during drilling or construction of boreholes therein.

In the oil and gas industry, a common problem in drilling wells or boreholes in subterranean formations is the loss of circulation of fluids, such as drilling fluids or muds, out of the borehole and into the subterranean formation during the drilling. Such lost fluids typically go into fractures or other openings that may be preexisting or possibly induced by excessive pressures during the subterranean operation.

A large variety of materials have been used or proposed in attempts to cure lost circulation. Traditional fluid loss materials are generally categorized as either solid materials or settable/polymeric materials. Traditional solid materials may be divided into three types or categories: fibrous materials, such as shredded automobile tires or sawdust; flaky materials, such as wood chips and mica flakes; and granular materials, such as ground nutshells. Settable materials include, for example, cement slurries, whose strength increases with time after placement. Polymeric materials include, for example, polyacrylamide dispersed in water that may then emulsify in a paraffinic mineral oil, typically using a polyamine as an emulsifier.

Another known example provides an improved lost circulation material that comprises a blend of a resilient, angular, carbon-based material and a water-swellable, but not water-soluble, crystalline synthetic polymer. Preferred carbon-based materials comprise resilient graphite carbon particles and ungraphitized carbon particles. Preferred synthetic polymers comprise polyacrylamide, and most preferably a dehydrated crystallized form of cross-linked polyacrylamide that will readily swell following exposure to water or aqueous based fluids. Such swelling may be delayed by salts in the water, such as the use of brine or addition of calcium chloride. However, these polymers have a soft consistency, and do not adhere to each other. As such, their ability to form strong barriers capable of preventing lost circulation is diminished.

Finally, gelling a treatment fluid using a polymeric material may be used to increase the fluid viscosity such that fluid loss is less likely to occur. In many subterranean operations the treatment fluid is not just gelled, but also crosslinked to further increase viscosity and reduce fluid loss.

Although many materials and compositions exist and have been proposed for preventing lost circulation, there continues to be a need for even more versatile and better compositions and methods for preventing lost circulation.

SUMMARY OF THE INVENTION

The present disclosure pertains to methods and compositions for preventing or alleviating the loss of drilling fluids and other well treatment fluids into a subterranean formation during drilling or construction of boreholes therein.

Some embodiments of the present invention provide methods comprising: introducing directly into a subterranean zone penetrated by a wellbore, a mixture having a first pH, the mixture containing separate swelled particles of a polymeric material capable of reversibly attaching to other swelled particles of the polymeric material, and introducing a material sufficient to lower the pH of the polymeric material to a second pH lower than the first pH, thereby resulting in the swelled particles attaching to each other.

Other embodiments of the present invention provide methods comprising: introducing directly into a subterranean zone penetrated by a wellbore, a mixture having a first pH, the mixture containing separate swelled particles of a polymeric material capable of reversibly attaching to other swelled particles of the polymeric material, and after introduction of the mixture, introducing a material sufficient to lower the pH of the polymeric material to a second pH lower than the first pH, thereby resulting in the swelled particles attaching to each other.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

FIG. 1 is a representation of particles of a swelled polymer attaching to each other under acid conditions.

DETAILED DESCRIPTION

The present disclosure pertains to methods and compositions for preventing or alleviating the loss well treatment fluids, such as drilling fluids, into a subterranean formation during drilling or construction of boreholes therein. In contrast to conventional lost circulation materials, the presently disclosed compositions may be effective at sealing or plugging both small fissures and large fractures and have utility over a wide range of temperatures, including the high temperatures and high pressures associated with current wellbore sites. Further, the compositions can be relatively easily removed by increasing the pH in the area where they are placed down hole. In addition, due to their high adhesion properties, larger holes may be plugged, and for longer periods of time than with conventional lost circulation materials.

The present disclosure uses particles of swelled polymers, which are able to reversibly agglomerate with a pH change so as to form a barrier to fluid movement. Under basic conditions involving high pH, the swelled polymer particles remain distinct; however, under low pH, the polymer particles agglomerate attach to each other, thereby forming agglomerations of swelled particles which can form a barrier to lost circulation.

"Fluid loss," as that term is used herein, refers to the undesirable migration or loss of fluids (such as the fluid portion of a drilling mud or cement slurry) into a subterranean formation and/or a proppant pack. Treatment fluids may be used in any number of subterranean operations, including drilling operations, fracturing operations, acidizing operations, gravel-packing operations, acidizing operations, well bore clean-out operations, and the like. Fluid loss may be problematic in any number of these operations. In fracturing treatments, for example, fluid loss into the formation may result in a reduction in fluid efficiency, such that the fracturing fluid cannot propagate the fracture as desired. And fluid loss in drilling operations may lead to increased expense and early bit degradation. Fluid loss control materials are additives that lower the volume of a filtrate that passes through a filter medium.

That is, they block the pore throats and spaces that otherwise allow a treatment fluid to leak out of a desired zone and into an undesired zone. Fluid loss control materials are used in subterranean treatment fluids to fill/bridge the pore spaces in a formation matrix, thereby forming a type of filter cake that blocks the pore spaces in the formation, and prevents fluid loss therein. In some embodiments, a fluid loss control agent may be used in conjunction with a drilling operation.

Diverting agents have similar actions but strive for a somewhat different result. Diverting agents are used to seal off a portion of the subterranean formation. By way of example, in order to divert a treatment fluid from highly permeable portions of the formation into the less permeable portions of the formation, a volume of treatment fluid may be pumped into the formation followed by a diverting material to seal off a portion of the formation where the first treatment fluid penetrated. After the diverting material is placed, a second treatment fluid may be placed wherein the second treatment will be diverted to a new zone for treatment by the previously placed diverting agent. When being placed, the treatment fluid containing the diverting agent will flow most readily into the portion of the formation having the largest pores, fissures, or vugs, until that portion is bridged and sealed, thus diverting the remaining fluid to the next most permeable portion of the formation. These steps may be repeated until the desired number of stages of treating fluid has been pumped. Generally, the methods of diverting using the particles of swelled polymers of the present invention are preformed at matrix flow rates; that is, flow rates and pressures that are below the rate/pressure sufficient to create or extend fractures in that portion of a subterranean formation.

Plugging agents are similar to diverting agents. Whereas diverting agents are used to seal off a portion of the subterranean formation, plugging agents are used to seal off a full section of well bore, providing zonal isolation. When a particulate plugging agent is used, the effect is similar to that of a diverting agent, that is a fluid is placed having the plugging agent therein and the plugging agent seals the well bore face such that fluid cannot enter the permeable zones until the plugging agent is removed. In some embodiments, it may be desirable to use the particles of swelled polymers to completely fill a portion of an annulus along a well bore. In such embodiments, large quantities of the diverting agent may be required in order to completely close a flow path rather than simply block pore throats or rock faces.

According to the prevent disclosure, an improved lost circulation material (LCM) may be obtained by using these swelled polymers in a treatment fluid that is used during drilling operations into subterranean zones. The swelled polymers may be introduced directly to the wells as individual particles. Then, once the particles are exposed to a sufficiently low pH they tend to adhere to neighboring particles as agglomerations. In other embodiments, the particles adhere to other materials in addition to each other.

In an example as shown in FIG. 1, when two particles 10 are introduced under acidic conditions, the particles adhere to each other.

Examples of swellable polymeric materials for use as the lost circulation materials of the present invention include N-acryloyl amino acid compounds. N-acryloyl amino acids are capable of binding in seconds, as easily as Velcro, and form a bond strong enough to withstand repeated stretching. For example, when two pieces of gels were placed together under acidic conditions, for example, pH 3 or less, they adhere together instantly. This is due to the polymer backbone having flexible-pendant side chains carrying an optimal balance of hydrophilic and hydrophobic moieties that allows the side chains to mediate hydrogen bonds across the polymer interfaces with minimal steric hindrance and hydrophobic collapse. Further, the interaction is rapid, occurring within seconds of separating the pH sensitive polymers or juxtaposition of two separate polymer pieces. The interaction is also reversible and can be switched on and off via changes in pH, allowing external control over the healing process. Adjusting the solution's pH levels up or down allows for the pieces to adhere to each other (low pH) and separate (high pH) very easily.

Moreover, the pH sensitive polymers can sustain multiple cycles of attachment and separation without compromising their mechanical properties and healing kinetics. The process may be repeated numerous times without any reduction in the weld strength.

Any suitable pH changing materials may be used. Examples of pH lowering materials include N-Flow 408® or N-Flow 412®, delayed acid generating products available from Halliburton Energy Services of Houston, Tex. Examples of suitable pH raising materials include any standard base, such as sodium hydroxide, potassium hydroxide, ammonium hydroxide, sodium carbonate, potassium carbonate, and the like.

The method may include introducing a mixture directly into a subterranean zone penetrated by a wellbore. The mixture has separate swelled particles of a polymeric material capable of reversibly attaching to other swelled particles of the polymeric material. The pH of the mixture would be such that the swelled particles remain separate, so that the particles may be introduced down the wellbore without adhering to each other. In some embodiments, the pH that allows the swelled particles to remain separate is from 4 to 14. In other embodiments, the pH is 7 to 14.

After introduction of the mixture to the wellbore, a liquid is introduced down the wellbore to lower the pH of the polymeric material to a second pH lower than the first pH, thereby resulting in the swelled particles attaching to each other. In some embodiments, the second pH is 4 or less. In other embodiments, the pH is 3 or less.

In other embodiments, a delayed acid generator that will lower the pH of upon activation can be added simultaneously with the reversibly attachable polymeric material. The delayed acid generator could be mixed in with the initial slurry of swelling particles and then activated once down the wellbore. The activation may be by an increase in temperature. N-Flow 408® is an example of a product that will generate acid when it is exposed to elevated temperatures.

In preferred embodiment, the swelled polymeric materials may be insoluble in water, so that they do not dissolve in the drilling fluid.

Other materials may be added to the polymer to improve the stability of the particles. For example, vitrified shale, formation conditioning agents, carbon fibers, glass fibers, metal fibers, minerals fibers, clay, colloidal polymers, stabilizers, may be added to strengthen the polymer. In addition, other lost circulation materials, such as black walnut shells, calcium carbonate particles, sea shells and the like, may be used with the pH sensitive polymers in the drilling fluid.

Drilling fluid or drilling mud is a designed fluid that is circulated through a wellbore to facilitate a drilling operation. Functions of a drilling fluid can include, without limitation, removing drill cuttings from the wellbore, cooling and lubricating the drill bit, aiding in the support of the drill pipe and the drill bit, and providing a hydrostatic head to maintain integrity of the wellbore walls and preventing blowouts from occurring.

It is often desirable to change the density of a drilling fluid to maintain pressure balance within a wellbore and keep the wellbore stable. Changing the density is usually accomplished by adding a weighting agent to the drilling fluid. Often, the weighting agent is barite (barium sulfate), sometimes spelled baryte. Barite is an insoluble material, and additional stabilizers are usually added to the drilling fluid to maintain the salt in a suspended state. Stabilizers can include, for example, thickeners, viscosifying agents, gelling agents and the like.

Water used in embodiments of the drilling fluid formulations of the present invention may be freshwater or saltwater (e.g., water containing one or more salts dissolved therein, seawater, brines, saturated saltwater, etc.). In general, the water may be present in an amount sufficient to form a pumpable slurry.

Sample pH sensitive polymers may be prepared by free radical polymerization in aqueous solution containing 1 mmol/mL of N-acryloyl 6-aminocaproic acid (A6ACA), N,N'-methylene bisacrylamide (Bis-Am), 0.5% ammonium persulfate (initiator), and 0.1% tetramethylethylenediamine (accelerator).

To synthesize A6ACA polymers containing different cross-linker content, 0.1%, 0.2%, and 0.5% (wt/vol) BisAm (Sigma-Aldrich, Inc.) was added to the 1 M deprotonated A6ACA solution and polymerized as described above using the ammonium persulfate/tetramethylethylenediamine (APS/TEMED) redox initiators for 16 hours at 37° C. To create polymers with varying pendant side chains, 1 M solutions of the respective monomers (0.1291 g/mL for A2AGA, 0.157 g/mL for A4ABA, 0.185 g/mL for A6ACA, 0.213 g/mL for A8ACA, and 0.241 g/mL for A11AUA) were deprotonated using equimolar NaOH and used.

A

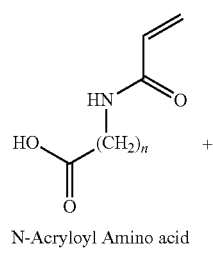

N-Acryloyl Amino acid

+

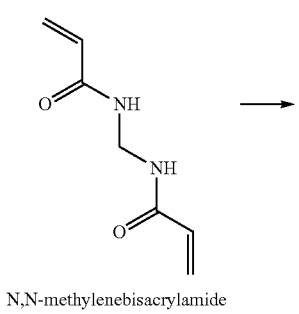

N,N-methylenebisacrylamide

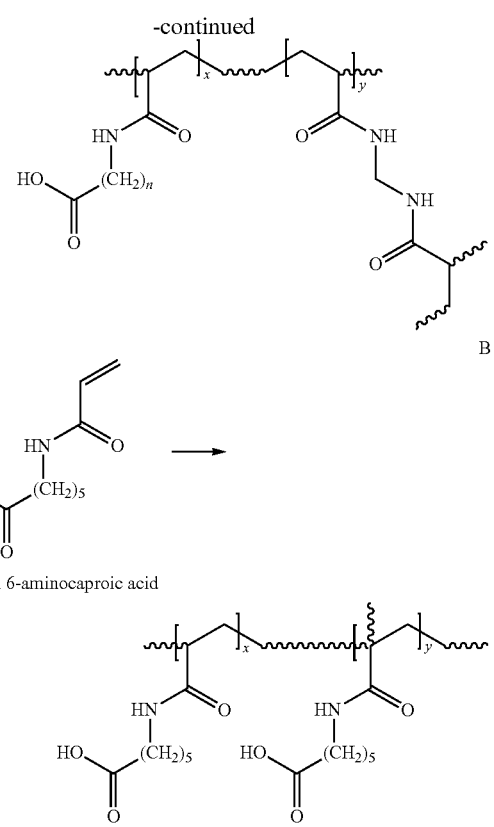

N-Acryloyl 6-aminocaproic acid

Upon synthesis, two A6ACA hydrogels weld rapidly to each other within 2 seconds when brought in contact in low pH aqueous solution (pH≤3). The attached hydrogels exhibit a strong interface capable of withstanding their own weight, repeated stretching, and exposure to boiling water. The samples are able to sustain large deformations and recover their size and shape when the stress is released. The pH-mediated attachment is reversible: two attached hydrogels separate when exposed to high pH (pH≥10). For example, two cylindrical shaped hydrogels that were attached end to end were immersed in 1 M NaOH at pH 14 for 10 minutes whereupon the hydrogels separated. The separated hydrogels were then briefly rinsed in PBS to remove excess NaOH and reintroduced into an acidic solution (pH 0.3) whereupon they reattached after less than 5 seconds of contact. The reattached hydrogels were then reintroduced into 1 M NaOH solution for separation. This cycle of attachment-separation was performed more than 12 times.

A study of the temporal dependence of the attaching of the hydrogels indicates an increase in weld-line strength with time over a period of 10 seconds to 24 hours. Hydrogels that have been attached for 10 seconds withstand more than 2.04±0.07 kPa stresses whereas those attached for over 5 minutes fail upon an application of 2.7±0.2 kPa stress. In both cases, the hydrogels always rupture in the bulk region, whereas the welded interface remains intact, indicating a strongly attached interface. The low mechanical strength of the bulk region is attributed to its inherent soft nature compared to the surfaces that are in contact with the low-pH solution. Therefore, the interfacial region toughens as a result of protonation of the carboxyl groups and subsequent increase in their hydrogen bonding. In contrast, the interior bulk regions remain soft because protons cannot diffuse into the polymer network within the experimental timescales.

However, after extended exposure (approximately 24 hours) to low-pH solution, the hydrogels become capable of withstanding large stresses (35±3 kPa) and break at the interface. Moreover, the 24-hour attached hydrogels become opaque because of protonation-induced hydrophobic collapse of the polymer chains.

To determine the effect of cross-link density on attachment, A6ACA hydrogels with varying cross-linker content were prepared. The self-attachment depends strongly on the extent of cross-linking and thereby the swelling behavior of the hydro gels. Specifically, the interfacial strength of attached hydrogels decreases with increasing cross-linker content. The reduction in attachment efficiency could be attributed either to the restricted mobility of the side chains or to the decrease in the compliance of the hydrogel with increasing cross-linking, both of which could impede the formation of hydrogen bonds across the interface. The latter effect, however, seems to be the more likely explanation given that the hydrogel still exhibits significant swelling at the high cross-link densities, indicating that the molecular pores might be considerably larger than the side chains and thus do not interfere significantly with the side-chain mobility.

The effect of pendant side-chain length on attachment by synthesizing hydrogels with similar cross-linker content but varying side-chain lengths, containing 1-10 methylene groups, terminating with a carboxyl group showed that hydro gels with side chains containing 1-3 and 10 methylene groups do not exhibit any attachment and those containing 7 methylene groups [N-acryloyl 8-aminocaprylic acid (A8ACA)] show weak attachment. The A8ACA hydrogels required more than 5 min to attach, and the attached hydrogels could be separated easily by a small stress (0.267±0.008 kPa). Thus, interestingly, the attaching ability depends nonmonotonically on the side-chain length.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
    introducing directly into a subterranean zone penetrated by a wellbore, a mixture having a first pH, the mixture containing separate swelled particles of a polymeric material capable of reversibly attaching to other swelled particles of the polymeric material, and
    introducing a material sufficient to lower the pH of the polymeric material to a second pH lower than the first pH, thereby resulting in the swelled particles attaching to each other.

2. The method of claim 1, wherein the first pH is from 4 to 14.

3. The method of claim 1, wherein the first pH is from 7 to 14.

4. The method of claim 1, wherein the second pH is 4 or less.

5. The method of claim 1, wherein the second pH is 3 or less.

6. The method of claim 1, wherein the swelled particles are comprised of a polymer of an N-acryloyl acid.

7. The method of claim 6, wherein the N-acryloyl acid is N-acryloyl 6-aminocaproic acid.

8. The method of claim 7, wherein the polymer of N-acryloyl 6-aminocaproic acid is polymerized by free-radical polymerization.

9. The method of claim 1, wherein after the step of lowering the pH of the polymeric material, introducing a material sufficient to raise the pH of the polymeric material to first pH, thereby resulting in the swelled particles separating from each other.

10. A method comprising:
    introducing directly into a subterranean zone penetrated by a wellbore, a mixture having a first pH, the mixture containing separate swelled particles of a polymeric material capable of reversibly attaching to other swelled particles of the polymeric material, and
    after introduction of the mixture, introducing a material sufficient to lower the pH of the polymeric material to a second pH lower than the first pH, thereby resulting in the swelled particles attaching to each other.

11. The method of claim 10, wherein the first pH is from 4 to 14.

12. The method of claim 10, wherein the first pH is from 7 to 14.

13. The method of claim 10, wherein the second pH is 4 or less.

14. The method of claim 10, wherein the second pH is 3 or less.

15. The method of claim 10, wherein the swelled particles are comprised of a polymer of an N-acryloyl acid.

16. The method of claim 15, wherein the N-acryloyl acid is N-acryloyl 6-aminocaproic acid.

17. The method of claim 16, wherein the polymer of N-acryloyl 6-aminocaproic acid is polymerized by free-radical polymerization.

18. The method of claim 10, wherein after the step of lowering the pH of the polymeric material, introducing a material sufficient to raise the pH of the polymeric material to first pH, thereby resulting in the swelled particles separating from each other.

* * * * *